United States Patent
Katuri et al.

(10) Patent No.: US 9,443,516 B2
(45) Date of Patent: Sep. 13, 2016

(54) FAR-FIELD SPEECH RECOGNITION SYSTEMS AND METHODS

(71) Applicant: Honeywell International Inc., Morristown, NJ (US)

(72) Inventors: SrinivasaRao Katuri, Bangalore (IN); Amit Kulkarni, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 87 days.

(21) Appl. No.: 14/151,554

(22) Filed: Jan. 9, 2014

(65) Prior Publication Data

US 2015/0194152 A1    Jul. 9, 2015

(51) Int. Cl.

| | |
|---|---|
| *G10L 15/00* | (2013.01) |
| *G10L 25/00* | (2013.01) |
| *G10L 15/22* | (2006.01) |
| *G10L 15/28* | (2013.01) |
| *G10L 15/30* | (2013.01) |
| *G10L 21/0208* | (2013.01) |
| *G10L 21/0216* | (2013.01) |

(52) U.S. Cl.
CPC ............... *G10L 15/22* (2013.01); *G10L 15/28* (2013.01); *G10L 15/30* (2013.01); *G10L 21/0208* (2013.01); *G10L 2021/02166* (2013.01)

(58) Field of Classification Search
None
See application file for complete search history.

(56) References Cited

U.S. PATENT DOCUMENTS

| | | | | |
|---|---|---|---|---|
| 5,737,485 A | * | 4/1998 | Flanagan | G10L 15/16 704/232 |
| 6,219,645 B1 | | 4/2001 | Byers | |
| 6,230,137 B1 | | 5/2001 | Has et al. | |
| 6,324,499 B1 | * | 11/2001 | Lewis | G10L 15/26 704/233 |
| 6,584,439 B1 | * | 6/2003 | Geilhufe | G10L 15/26 704/270 |
| 7,447,635 B1 | | 11/2008 | Konopka et al. | |
| 9,076,454 B2 | * | 7/2015 | Agapi | G10L 21/0208 |
| 2002/0091527 A1 | * | 7/2002 | Shiau | G10L 15/30 704/270.1 |
| 2003/0101054 A1 | * | 5/2003 | Davis | G10L 15/26 704/235 |
| 2009/0018826 A1 | * | 1/2009 | Berlin | G10L 15/07 704/223 |
| 2009/0271188 A1 | * | 10/2009 | Agapi | G10L 21/0208 704/233 |
| 2010/0211387 A1 | * | 8/2010 | Chen | G10L 25/78 704/226 |
| 2015/0162018 A1 | * | 6/2015 | Palanisamy | G10L 13/00 704/275 |

OTHER PUBLICATIONS

I. Rodomagoulakis, et al. "Experiments on Far-field Multichannel Speech Processing in Smart Homes." Proceedings 18th International Conference on Digital Signal Processing (DSP 2013), Santorini, Greece, Jul. 2013. 6 pages.

Shimpei Soda, et al. "Handsfree Voice Interface for Home Network Service Using a Microphone Array Network." 2012 Third International Conference on Networking and Computing. Graduate School of System Informatics, Kobe University. 6 pages.

Amaya Arcelus, et al. "Integration of Smart Home Technologies in a Health Monitoring System for the Elderly." 21st International Conference on Advanced Information Networking and Applications Workshops. IEEE Computer Society. 2007. 6 pages.

(Continued)

*Primary Examiner* — Marcus T Riley
(74) *Attorney, Agent, or Firm* — Brooks, Cameron & Huebsch, PLLC

(57) ABSTRACT

A method for far-field speech recognition can include determining a location for a plurality of sound recognition devices, communicatively coupling each of the plurality of sound recognition devices, adjusting a sound reception for the plurality of sound recognition devices to receive a voice command from a particular direction, and sending instructions to a device based on the voice command.

20 Claims, 3 Drawing Sheets

(56) References Cited

OTHER PUBLICATIONS

Shimpei Soda, et al. "Introducing Multiple Microphone Arrays for Enhancing Smart Home Voice Control." The Institute of Electronics Information and Communication Engineers. Graduate School of System Informatics, Kobe University. 6 pages.

Potamitis, I, et al., "An integrated System for Smart-Home Control of Appliances based on Remote Speech Interaction", Eurospeech 2003 Geneva XP-007006560 (2003) 4 pp.

Extended Search Report form related European patent application No. 15150227.5 dated Jul. 9, 2015 7 pp.

Exam Report from related European Application No. 15150227.5, dated Jul. 4, 2016, 5 pp.

* cited by examiner

FAR-FIELD SPEECH RECOGNITION SYSTEMS AND METHODS

TECHNICAL FIELD

The present disclosure relates to far-field speech recognition systems and methods.

BACKGROUND

Devices (e.g., computing devices, electrical devices, household devices, etc.) can be utilized throughout a building (e.g., house, office building, campus, etc.). Each of the devices can have a plurality of functionality and corresponding settings for each functionality. Sound recognition devices (e.g., microphones, etc.) can be utilized to receive sound and/or record sound within a particular area.

DETAILED DESCRIPTION

A method for far-field speech recognition can include determining a location for a plurality of sound recognition devices, communicatively coupling each of the plurality of sound recognition devices, adjusting a sound reception for the plurality of sound recognition devices (e.g., as a microphone array to form an acoustic beam towards a distant user) to receive a voice command from a particular direction, and sending instructions to a device based on the voice command.

Far-field speech recognition can include a number of communicatively coupled sound recognition devices (e.g., microphones, etc.). Each of the number of sound recognition devices can be communicatively coupled via a network (e.g., cloud computing network, local area network (LAN), wide area network (WAN), etc.). The communicatively coupled sound recognition devices can by dynamically adjusted (e.g., adjusted upon receiving a sound, adjusted upon receiving a trigger word, etc.) to a direction of a voice command from a user. For example, the number of sound recognition devices can utilize an adaptive beam to focus on the voice command from the user and increase a sound quality of the voice command.

Far-field speech recognition can be utilized to receive voice commands from a variety of users at a plurality of locations within an area. The users may be able to direct voice commands in a plurality of directions and the number of sound recognition devices can dynamically adjust to receive the voice commands in each of the plurality of directions.

The number of voice recognition devices can send the voice commands to a computing hub (e.g., computing device, computer, cloud computing network, etc.). The computing hub can be utilized to for audio processing (e.g., determine instructions for a number of devices, identify the user of the voice command, sending instructions to the number of devices to change a setting of the number of devices that correspond to the voice command, etc.). That is, a user can change settings of the number of devices by giving a voice command at a plurality of locations that can be directed to a number of different direction.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of devices" can refer to one or more devices.

Figure 1:
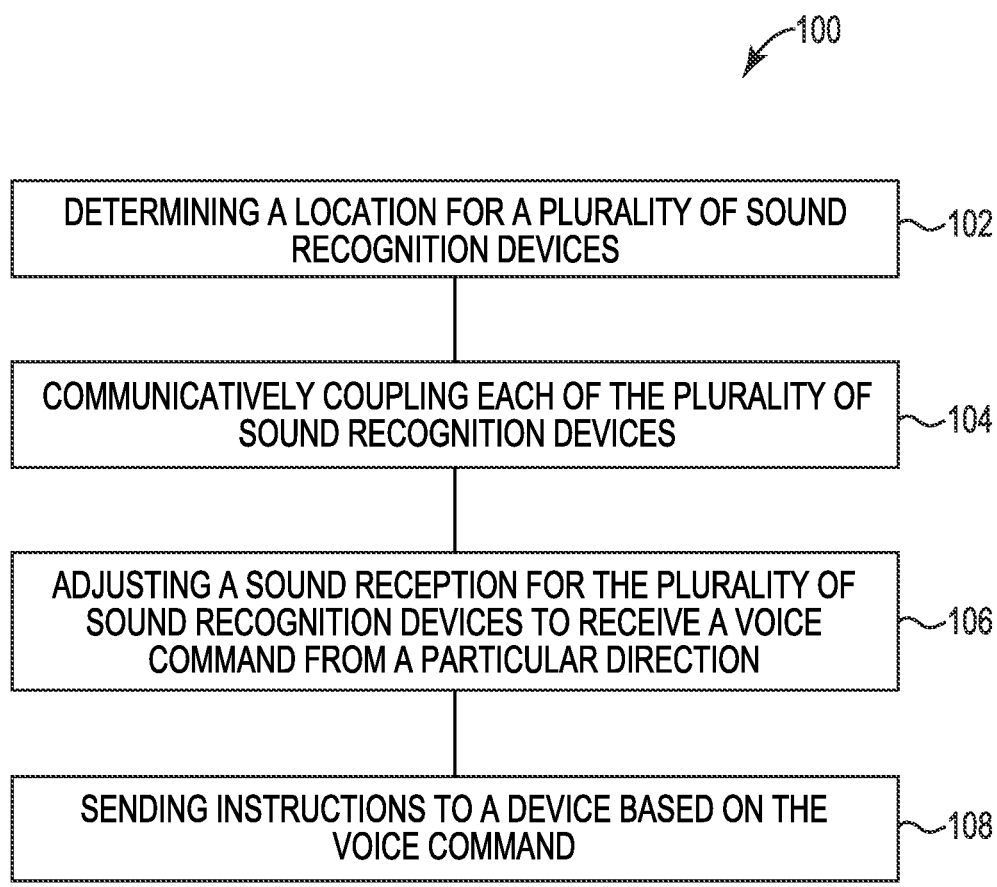
FIG. 1 illustrates an example of a method for far-field speech recognition in accordance with one or more embodiments of the present disclosure.

FIG. 1 illustrates an example of a method 100 for far-field speech recognition in accordance with one or more embodiments of the present disclosure. The method 100 can include a system that includes a computing device and/or a computing hub to receive voice commands from a variety of users. In addition, the method 100 can be utilized to receive voice commands to change and/or alter a number of settings for devices from a plurality of locations that include sound recognition devices.

At 102 the method 100 can include determining a location for a plurality of sound recognition devices. Determining a location for the plurality of sound recognition devices can include deciding on a number of locations within an area (e.g., room, building, house, office, etc.) to place each of the plurality of sound recognition devices. Determining the location for the plurality of sound recognition devices can include determining a plurality of features of the area. The plurality of features can include, but is not limited to: a square footage of the area, a height of the area, acoustics of the area, average occupancy over periods of time, average sound levels for the area, among other features that can affect sound reception quality within the area.

A number of the plurality of sound recognition devices can be coupled to a number of radio devices (e.g., wireless radio, wireless router, Zigbee, 900 MHz narrow band FHSS radio, etc.). The number of radio devices can be utilized to extend a communication distance (e.g., distance capable of transferring communication, etc.) for the number of sound recognition devices. The number of radio devices can send voice commands received by the sound recognition devices to a network and/or computing hub as described herein. In one example, a first portion of the plurality of sound recognition devices can be coupled to a first radio device and a second portion of the plurality of sound recognition devices can be coupled to a second radio device. In this example, voice commands received by the first portion of the plurality of sound recognition devices can be sent to a computing hub via the first radio device and voice commands received by the second portion of the plurality of sound recognition devices can be sent to the computing hub via the second radio device.

Determining the location for each of the plurality of sound recognition devices can include determining a location of a number of existing devices that include sound recognition devices within the area. The number of existing devices that include sound recognition devices can include electronic devices such as televisions, microwaves, thermostats, refrigerators, security systems, fire systems, among other electronic devices that can include sound recognition devices. The number of existing devices can also include communication capabilities (e.g., WIFI, Bluetooth, Ethernet, NFC, etc.) to communicatively couple the existing devices with the plurality of sound recognition devices. For example, the plurality of sound recognition devices and the number of existing devices can be communicatively coupled via a network and/or a computing hub.

At 104 the method 100 can include communicatively coupling each of the plurality of sound recognition devices. Communicatively coupling each of the plurality of sound recognition devices can include utilizing radio devices and/or wireless communication devices (e.g., wireless router, Bluetooth, etc.) to send received voice commands to a computing hub. For example, a number of the plurality of sound recognition devices can be coupled to a radio device and/or a wireless communication device and send any received voice commands to a computing hub via the radio device and/or wireless communication device.

As described herein, the plurality of sound recognition devices can include a number of existing devices that include sound recognition devices. The number of existing devices that include sound recognition devices can utilize the same and/or different type of wireless communication devices compared to the plurality of sound recognition devices. For example, a portion of the plurality of sound recognition devices can utilize radio devices to communicate voice commands to the computing hub and a television with an existing sound recognition device can utilize a WWI connection to communicate voice commands to the computing hub.

At 106 the method 100 can include adjusting a sound reception for the plurality of sound recognition devices (e.g., as a microphone array to form an acoustic beam towards a distant user) to receive a voice command from a particular direction. Adjusting the sound reception can include adjusting a sound reception direction of the plurality of sound recognition devices, That is, a sound recognition device can receive sound at a higher quality for a first direction compared to a second direction. Each of the plurality of sound recognition devices can be adjusted to receive a voice command to increase the sound quality of the received voice command.

Adjusting the sound reception for the plurality of sound recognition devices can include adjusting the plurality of sound recognition devices as a microphone array to form an acoustic beam towards a particular user (e.g., distant user, etc.). For example, the plurality of sound recognition devices can be adjusted to form a circular array with a distribution of a portion of the plurality of sound recognition devices within the circular array to form an acoustic beam towards a distant user.

Adjusting the sound reception for the plurality of sound recognition devices can include receiving a trigger word (e.g., voice command that indicates an intention of the user to give an additional voice command, voice command that activates a sound recognition device, voice command that activates a computing hub, etc.) from a user. Upon receiving the trigger word from the user a number of the plurality of sound recognition devices can be adjusted to increase the sound quality in the direction of the received trigger word from the user.

Adjusting the sound reception for the plurality of sound recognition devices can adjust a sound reception focus using adaptive spatial signal processing (e.g., filtering, noise cancelation, etc.) to improve the sound quality of voice commands that are received from the direction of the received trigger word. That is, adaptive spatial signal processing can be utilized to focus the sound reception of the plurality of sound recognition devices and remove noise (e.g., sound other than the voice command, echoes, background noise, etc.) to increase the sound quality of the voice command.

Adjusting the sound reception can include physically adjusting a position of a number of the plurality of sound recognition devices. For example, a number of the plurality of sound recognition devices can be repositioned to focus the sound reception of the sound recognition devices in the direction of the received voice command and/or trigger word, That is, a particular sound recognition device can be at a first position when a trigger word is received at the particular sound recognition device. A location of a source of the trigger word (e.g., location of the user, location of a source of the sound, location of a source of the trigger word and/or voice command, etc.) can be determined utilizing the plurality of sound recognition devices. The particular sound recognition device can be adjusted to a second position that is based on the determined location of the trigger word. The second position can be a position that can receive voice commands at a higher sound quality compared to the first position.

At 108 the method 100 can include sending instructions to a device based on the voice command. Sending instructions to the device can include analyzing and/or processing the voice command to determine a device to send instructions to that correspond to the voice command. That is, the voice command can correspond to a particular device and the voice command can be utilized to determine instructions that can change settings of the particular device.

When the device that is corresponding to the voice command is determined, the instructions corresponding to the voice command can be sent to the device. The instructions can include computing instructions that can be executed by a processor (e.g., processor 350-1, 350-2, . . . , 350-N as referenced in FIG. 3, etc.) coupled to the device. The instructions that are sent to the device can be executed by the processor to change a number of settings of the device and/or execute a number of functions of the device.

In one example, a voice command of "LOWER THE TEMPERATURE" can be spoken by a user and received by a number of the plurality of sound recognition devices. The voice command can be sent to a computing hub via a communication path and processed to determine a device that corresponds to the voice command. In this example, the computing hub can determine that a thermostat is the device that corresponds to the voice command. Instructions to lower a temperature setting can be sent to the thermostat. The instructions can be received by the thermostat and temperature settings of the thermostat can be changed to a lower temperature.

The method 100 can also include voice recognition, speech-to-text recognition, and/or identity confirmation. The voice recognition can be used to distinguish between a user giving the voice command and other people within the area who are not giving the voice command. The voice recognition can be utilized to eliminate background noise and to identify the user that is giving the voice command. For example, a user can give a trigger word and the voice of the user can be recognized. The recognized voice of the user giving the trigger word can be utilized to remove voices of other people and/or other sounds that are coming from the same area. That is, a computing hub and/or computing device coupled to the sound recognition device can remove sound that is not corresponding to the recognized voice of the user. Removing the sound that is not corresponding to the recognized voice of the user can increase a sound quality of the voice command received by the user.

The speech-to-text recognition can be utilized to convert voice commands from a user to text data (e.g., text instructions, etc.). The text data can be utilized to determine a device that corresponds to the voice command and/or utilized to determine a number of settings that are to be changed on a particular device based on the voice command. In addition, the speech-to-text recognition can be utilized to receive text data from a computing device and/or computing hub and convert the received text to audio that can be communicated via a speaker to the user. The received text can include updates for the user. For example, the received text can include a status update for the function and/or settings that were requested to be changed in the voice command from the user. In this example, the status update can be a confirmation that the settings and/or functions were successfully completed or changed.

The identity confirmation can include utilizing the received voice command and/or trigger word to identify the user. For example, a particular user can record the users voice at the computing hub. In this example, the computing hub can utilize a received voice command to compare to the saved voice of the user to confirm the identity of the user.

The identity information for the user can also include a number of security settings. For example, each of a number of users can have a security access associated with each of the number of users, The security access can correspond to a particular number of devices that the particular user is allowed to change settings for and/or utilize functions.

Far-field speech recognition can enable a user to change a number of settings for devices that are located in a different location from the user. In addition, the far-field speech recognition can enable a user to give voice commands in a variety of locations within an area without having to concern the user with the direction of the voice command and/or a direction of the device the user desires to change settings for and/or utilize functions.

Figure 2:
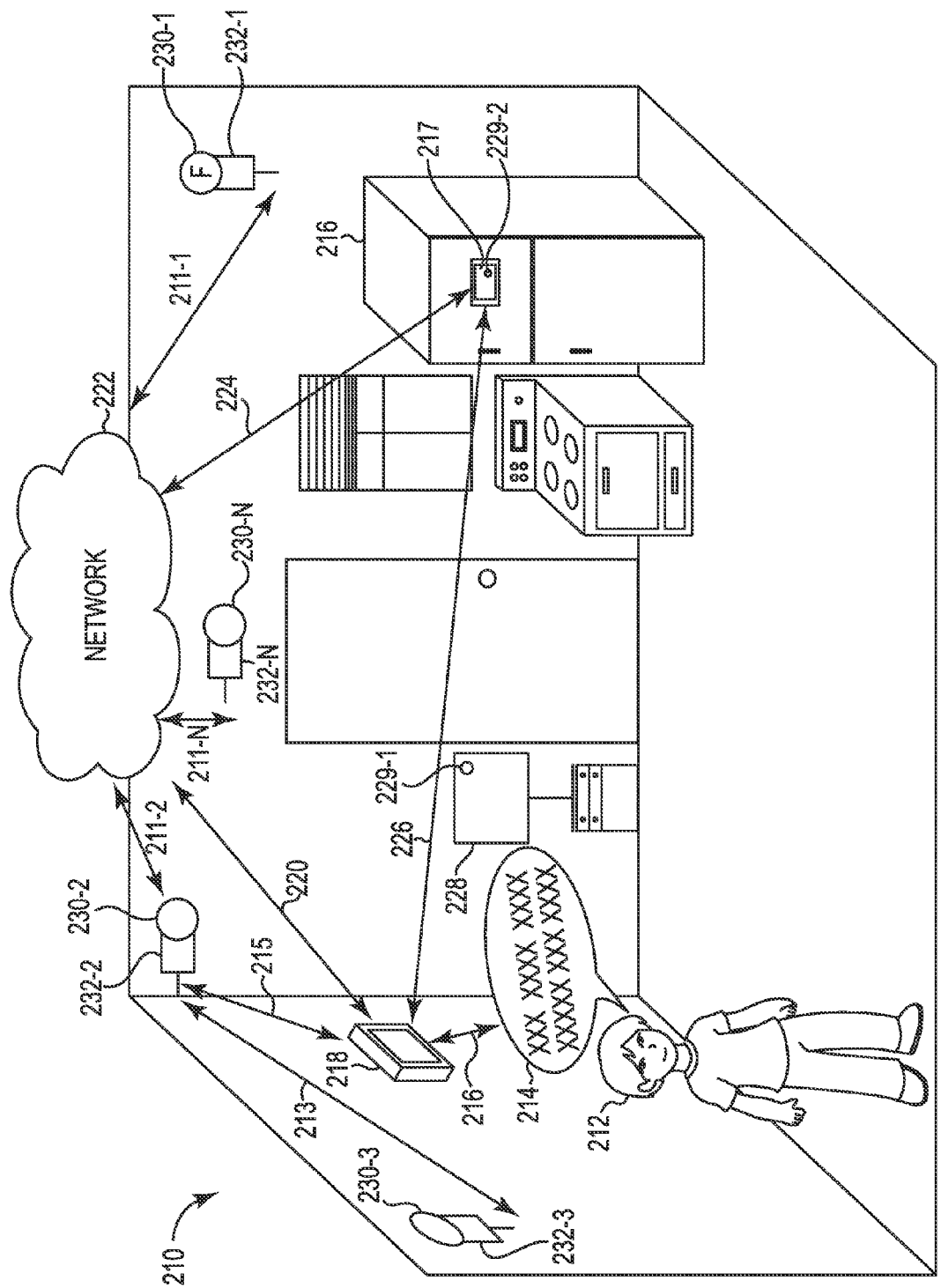
FIG. 2 illustrates an example of a far-field speech recognition system in accordance with one or more embodiments of the present disclosure.

FIG. 2 illustrates an example of a far-field speech recognition system 210 in accordance with one or more embodiments of the present disclosure. The far-field speech recognition system 210 can include a network 222 (e.g., cloud computing network, LAN, WAN, Internet, etc.). The network 222 can be utilized as a communication network between a computing device (e.g., computing hub (hub) 218, computer, etc.) and a plurality of sound recognition devices (e.g., microphones, sound recognition devices 230-1, 230-2, 230-3, 230-N, existing devices with sound recognition devices, etc.). That is, the network 222 can be utilized to transfer communication (e.g., voice commands 214, instructions, computing instructions, etc.) between the plurality of sound recognition devices 230-1, 230-2, 230-3, 230-N, a computing hub 218, and/or a number of other devices (e.g., refrigerator 216, thermostat 218, television 228, etc.), The plurality of sound recognition devices 230-1, 230-2, 230-3, 230-N can each be coupled to a number of radio devices 232-2, 232-2, 232-3, 232-N (e.g., wireless communication devices, router, radio communication devices, Bluetooth devices, etc.). For example, sound recognition device 230-2 can be coupled to radio device 232-2. The radio devices 232-2, 232-2, 232-3, 232-N can extend a communication area (e.g., area of communication, etc.) of the plurality of sound recognition devices 230-1, 230-2, 230-3, 230-N. The radio devices 232-2, 232-2, 232-3, 232-N can enable communication between sound recognition devices 230-1, 230-2, 230-3, 230-N that are located in a number of different areas (e.g., different levels, different rooms, etc.) within a building (e.g., home, office building, etc.).

The radio devices 232-2, 232-2, 232-3, 232-N can enable communication between sound recognition devices in a first area and sound recognition devices in a second area. In a similar manner, the radio devices 232-2, 232-2, 232-3, 232-N can enable communication between sound recognition devices in a first area and a computing hub in a second area. That is, voice commands 214 from a user 212 in a first area can be received by sound recognition devices within the first area and the voice command 214 can be sent via the radio devices associated with the sound recognition devices in the first area to a computing hub located in a second area.

The plurality of sound recognition devices 230-1, 230-2, 230-3, 230-N can be located at particular positions within the area to receive voice commands 214 from a plurality of different locations within the area. In particular embodiments, the plurality of sound recognition devices 230-1, 230-2, 230-3, 230-N can be located at positions within the area to receive voice commands from all or almost all locations within the area. That is, the plurality of sound recognition devices 230-1, 230-2, 230-3.230-N can receive voice commands 214 from a user 212 located at any position within the area and receive voice commands 214 that are directed in any direction within the area.

Determining a location for the plurality of sound recognition devices 230-1, 230-2, 230-3, 230-N can include determining a location of a number of existing devices that include sound recognition devices (e.g., television 228 with sound recognition device 229-1, refrigerator 217 with display 217 and with sound recognition device 229-2, etc.). Determining the location of the number of existing devices that include sound recognition devices can include determining a range of the sound recognition devices and utilizing the existing devices with the plurality of sound recognition devices 230-1, 230-2, 230-3, 230-N to receive voice commands. That is, the existing devices with sound recognition devices can be utilized instead of utilizing additional sound recognition devices. For example, the television 228 with sound recognition device 229-1 can be utilized instead of sound recognition device 230-N and corresponding communication path 211-N.

As described herein, the existing devices can include communication devices to send received voice commands to the computing hub 218 and/or to a network 222. That is, the user 212 can give a voice command 214 and the voice command 214 can be received at the sound recognition device 229-1 within the television 228. The television 228 can utilize a wireless communication device (e.g., WIFI, Bluetooth, radio device, etc.) to send the received voice command 214 to the computing hub 218 via path 215-1 and/or the network 222 via path 215-2. The computing hub 218 can utilize the network 222 by sending the communication via path 220.

The existing devices can also be devices to accept instructions to change settings and/or utilize functions of the device that correspond to the voice command 214. For example, the user 212 can give a voice command 214 that is received at a sound recognition device 230-2. In this example, the radio device 232-2 can send the voice command to the computing hub 218 and/or to the network 222 to process the voice command 214. As described herein, processing the voice command can include determining a device that corresponds to the voice command 214 and/or determining the instructions for the corresponding device. The voice command 214 can correspond to the refrigerator 216 and instructions can be sent to the refrigerator 216 via path 224. The refrigerator 216 can receive the instructions and change settings of refrigerator 218 that correspond to the instructions.

The voice command 214 can also be sent from a first sound recognition device 230-3 coupled to a first radio device 232-3 to a second sound recognition device 230-2 coupled to a second radio device 232-2 via path 213. Sending the voice command 214 from one sound recognition device to a second sound recognition device can enable voice commands received at the first sound recognition device be sent to the network 222 and/or computing hub 218 when the first sound recognition device is out of range for sending the voice command 214 directly to the network and/or computing hub 218. That is, the first sound recognition device can be at a first area that is not directly communicatively coupled (e.g., capable of having a direct communication path, etc.) to the network 222 and/or computing hub 218. The first sound recognition device can send the voice command to a second sound recognition device that is communicatively coupled to the network 222 and/or the computing hub 218. Communication between the sound recognition devices can increase the area that can receive voice commands 214 and change settings of devices.

The computing hub 218 can be an existing device such as a thermostat and/or security system. The computing hub 218 can include a sound recognition device to receive voice commands 214 via path 216. The computing hub 218 can be utilized to process the voice command 214 as described herein, and/or send received voice commands 214 to the network 222. That is, the computing hub 218 can be utilized to receive voice commands 214 directly from the user 212 and/or receive voice commands 214 from the plurality of sound recognition devices 230-1, 230-2, 230-3, 230-N via the radio devices 232-2, 232-2, 232-3, 232-N. The computing hub 218 can also be utilized to send instructions to each of the devices to change settings of the devices. For example, the voice command 214 can be processed and instructions corresponding to the voice command 214 can be sent to a corresponding device that the instructions are intended, In one embodiment, the voice command 214 can be "TURN ON THE TELEVISION". The voice command 214 can be received at sound recognition device 230-1 and sent to the computing hub 218 via network 222 utilizing path 211-1. The computing hub 218 can process the voice command and determine that the television is the device to receive the instructions. The computing hub 218 can then send instructions to the television 228 via path 215-1 and the television 228 can utilize the instructions to turn on. The sound recognition device 230-1 can be a sound recognition device that is also utilized by a fire system (e.g., security system that detects fires, etc.).

The far-field voice recognition system 210 can be utilized to change settings and/or perform functions of a number of devices via voice commands 214. The user 212 is capable of changing settings and/or performing functions of the number of devices even when the user 212 is in a location that is different than the number of devices.

Figure 3:
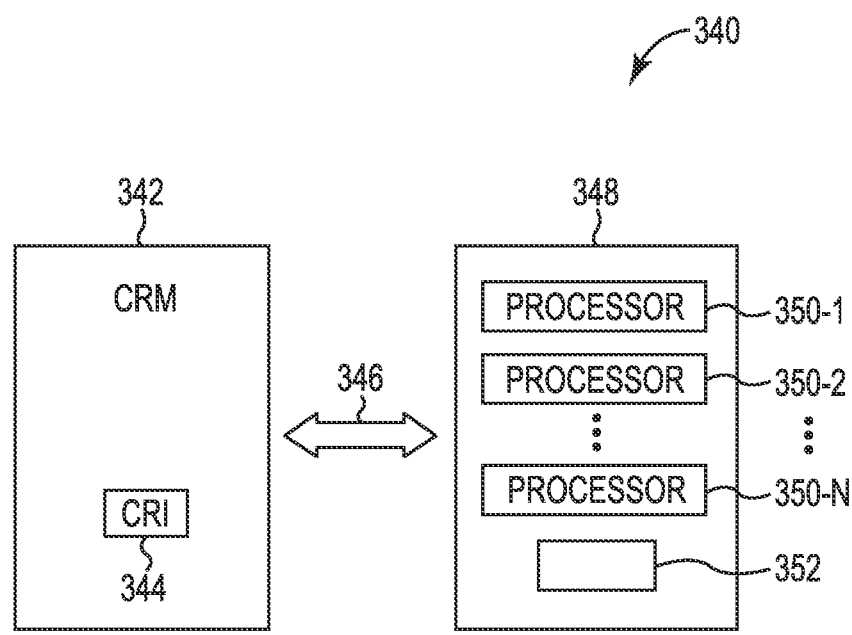
FIG. 3 illustrates a block diagram of an example of a computing device in accordance with one or more embodiments of the present disclosure.

FIG. 3 illustrates a block diagram of an example of a computing device 340 in accordance with one or more embodiments of the present disclosure. The computing device 340 can include a communication interface (e.g., wireless network interface controller, IEEE 802.11 adapters, etc.) for receiving wireless data. The communication interface can be integrated in the computing device 340 and/or be an external card.

The computing device 340, as described herein, can also include a computer readable medium (CRM) 342 in communication with processing resources 350-1, 350-2, . . . , 350-N. CRM 342 can be in communication with a device 348 (e.g., a Java application server, among others) having processor resources 350-1, 350-2, . . . , 350-N. The device 348 can be in communication with a tangible non-transitory CRM 342 storing a set of computer-readable instructions (CRI) 344 (e.g., modules) executable by one or more of the processor resources 350-1, 350-2, . . . , 350-N, as described herein. The CRI 344 can also be stored in remote memory managed by a server and represent an installation package that can be downloaded, installed, and executed. The device 348 can include memory resources 352, and the processor resources 350-1, 350-2, . . . , 350-N can be coupled to the memory resources 352.

Processor resources 350-1, 350-2, . . . , 350-N can execute CRI 34-4 that can be stored on an internal or external non-transitory CRM 342, The processor resources 350-1, 350-2, . . . , 350-N can execute CRI 344 to perform various functions. For example, the processor resources 350-1, 350-2, . . . , 350-N can execute CRI 344 to perform a number of functions (e.g., adjusting a sound reception for the plurality of sound recognition devices to receive a voice command from a particular direction, etc.). A non transitory CRM (e.g., CRM 342), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), as well as other types of computer-readable media.

The non-transitory CRM 342 can also include distributed storage media. For example, the CRM 342 can be distributed among various locations. The non-transitory CRM 342 can be integral, or communicatively coupled, to a computing device, in a wired and/or a wireless manner. For example, the non-transitory CRM 342 can be an internal memory, a portable memory, a portable disk. or a memory associated with another computing resource (e.g., enabling CRIs to be transferred and/or executed across a network such as the Internet).

The CRM 342 can be in communication with the processor resources 350-1 350-2, . . . , 350-N via a communication path 346. The communication path 346 can be local or remote to a machine (e.g., a computer) associated with the processor resources 350-1, 350-2, . . . , 350-N. Examples of a local communication path 346 can include an electrical bus internal to a machine (e.g., a computer) where the CRM 342 is one of volatile, non-volatile, fixed, and/or removable storage medium in communication with the processor resources 350-1, 350-2, . . . , 350-N via the electrical bus. Examples of such electrical buses can include Industry Standard Architecture (ISA), Peripheral Component Interconnect (PCI), Advanced Technology Attachment (ATA), Small Computer System Interface (SCSI), Universal Serial Bus (USB), among other types of electrical buses and variants thereof.

The communication path 346 can be such that the CRM 342 is remote from the processor resources e.g., 350-1, 350-2, . . . , 350-N, such as in a network relationship between the CRM 342 and the processor resources (e.g., 350-1, 350-2, . . . , 350-N). That is, the communication path 346 can be a network relationship. Examples of such a network relationship can include a local area network (LAN), wide area network (WAN), personal area network (PAN), and the Internet, among others. In such examples, the CRM 342 can be associated with a first computing device and the processor resources 350-1, 350-2, . . . , 350-N can be associated with a second computing device (e.g., a Javaserver).

As described herein, a "module" can include computer readable instructions (e.g., CRI 344) that can be executed by a processor to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for far-field speech recognition, comprising:
   determining a location of a plurality of sound recognition devices and corresponding electrical devices;
   communicatively coupling each of the plurality of sound recognition devices and corresponding electrical devices;
   receiving a voice command at a first sound recognition device and corresponding electrical device, wherein the first sound recognition device and corresponding electrical device are outside of a communication range of a computing hub;
   adjusting a sound reception for the plurality of sound recognition devices to receive the voice command from a particular direction based at least in part on the particular direction that the voice command is received from;
   sending, via the first sound recognition device and corresponding electrical device, the voice command to a second sound recognition device and corresponding electrical device;
   sending, via the second sound recognition device and corresponding electrical device, the voice command to the computing hub;
   generating, via the computing hub, instructions based on the voice command; and
   sending, via the computing hub, the instructions to a device communicatively coupled to the computing hub, wherein the device executes the instructions.

2. The method of claim 1, wherein determining the location for the plurality of sound recognition devices includes determining a location of a number of appliances with embedded speech recognition devices.

3. The method of claim 1, wherein determining the location for a plurality of sound recognition devices includes determining a location for each of the plurality of sound recognition devices to capture sound from a particular area.

4. The method of claim 1, wherein adjusting the sound reception for the plurality of sound recognition devices includes performing adaptive spatial signal processing of the sound recognition devices.

5. The method of claim 1, comprising placing the plurality of sound recognition devices in an array based on the determined locations.

6. The method of claim 1, wherein sending instructions to the device includes sending instructions to a device that is at a remote location from a location of the received voice command.

7. The method of claim 1, wherein sending instructions to the device includes sending the received voice command from a first room of a building to a device in a second room of the building.

8. A non-transitory computer readable medium, comprising instructions to:
   receive a voice command from a first sound recognition device and corresponding electrical device, wherein the voice command was received by a second sound recognition device and corresponding electrical device from a user located at a first position;
   adjust a sound reception to enhance aspects of the voice command based at least in part on the particular direction that the voice command is received from;
   identify the user based on the received voice command;
   determine an electrical device that is different than the first sound recognition device and corresponding electrical device that relates to the voice command;
   generate instructions based on the voice command; and
   send the instructions to the electrical device that is different than the first sound recognition device and corresponding electrical device, wherein the electrical device is not coupled to a sound recognition device.

9. The medium of claim 8, wherein the voice command includes a description for changing a setting of the device.

10. The medium of claim 8, wherein the instructions to adjust a sound reception includes instructions to adapt the sound reception to remove background noise not related to the voice command.

11. The medium of claim 8, comprising instructions to send the voice command to a cloud based computing device.

12. The medium of claim 8, wherein the first position is a remote location from the second position.

13. The medium of claim 8, wherein the instructions to identify the user includes instructions to determine an authorization level of the user.

14. The medium of claim 13, wherein the instructions to determine an authorization level includes instructions to determine if the user is authorized to change a number of settings of the device.

15. A system, comprising:
- a plurality of communicatively coupled sound recognition devices placed in an array to receive sound within an area, wherein a portion of the plurality of sound recognition devices are communicatively coupled to a computing hub;
- a number of devices communicatively coupled to the computing hub; and
- the computing hub including instructions to:
  - receive a number of voice commands from the portion of the plurality of sound recognition devices and corresponding electrical devices, wherein the number of voice commands are received by the plurality of communicatively coupled sound recognition devices and sent to the portion of the plurality of sound recognition devices;
  - identify a user based on the received number of voice commands;
  - determine a device from the number of devices communicatively coupled to the computing hub that relates to the voice command;
  - adjust a sound reception for the plurality of sound recognition devices to receive the voice command from a particular direction based at least in part on the particular direction that the number of voice commands are received from; and
  - send instructions to the determined device, wherein the determined device executes the instructions to change a number of settings on the determined device, wherein the instructions are based on the voice command, and wherein the determined device is a different device than the corresponding electrical devices that received the number of voice commands.

16. The system of claim 15, wherein the number of devices include a number of devices coupled to corresponding computing devices.

17. The system of claim 15, wherein the plurality of sound recognition devices are in a first location, the number of devices are in a second location, and the computing hub is in a third location.

18. The system of claim 17, wherein the plurality of sound recognition devices are coupled to a corresponding wireless radio to send the voice command to the computing hub.

19. The system of claim 15, wherein the computing hub utilizes a cloud computing network to process received voice commands.

20. The system of claim 15, wherein the instructions to identify the user includes instructions to determine a portion of the number of devices, wherein the portion of the number of devices are devices that the user has access to alter settings.

* * * * *